Oct. 10, 1944.   M. ZAIGER   2,360,299
WINDSHIELD DEFROSTER
Filed Feb. 28, 1942
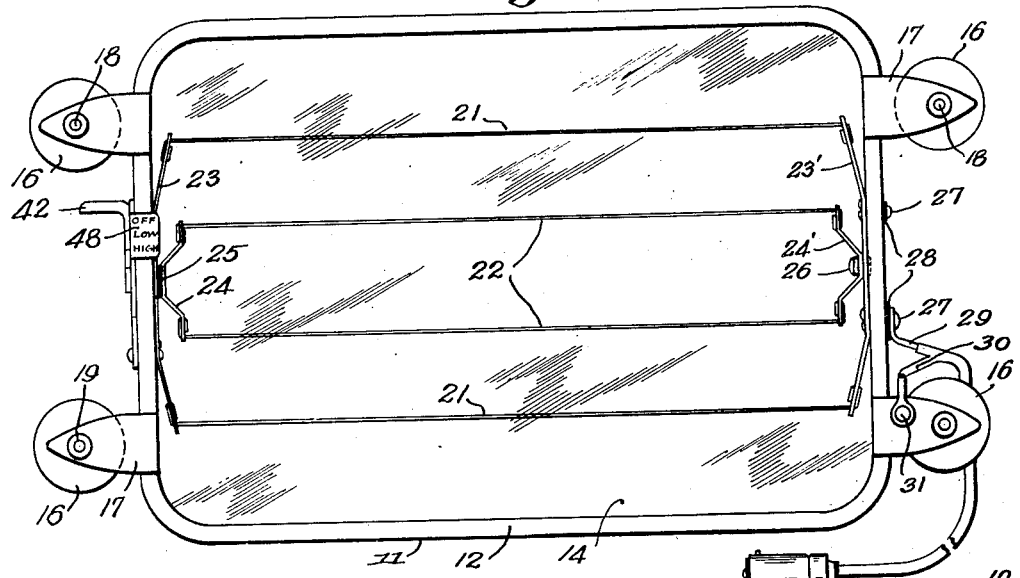
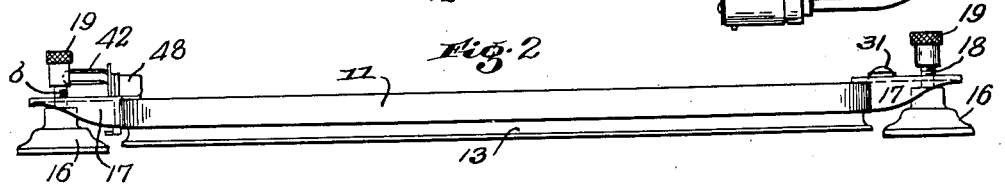
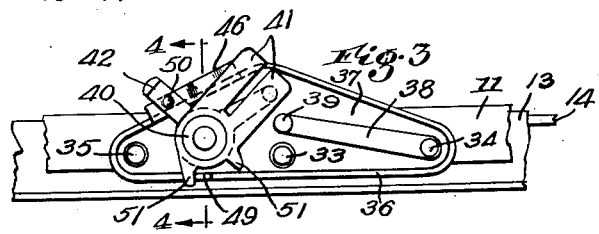
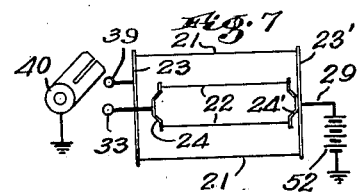
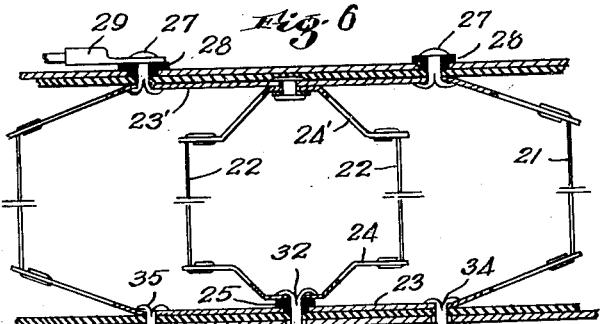
Inventor
Max Zaiger
By Thomson & Thomson
his Attys.

Patented Oct. 10, 1944

2,360,299

UNITED STATES PATENT OFFICE 2,360,299

WINDSHIELD DEFROSTER

Max Zaiger, Swampscott, Mass.

Application February 28, 1942, Serial No. 432,877

1 Claim. (Cl. 219—19)

This invention relates to windshield defrosters, and pertains more particularly to defrosters of the framed-glass type which are removably applied to the surface of a windshield or the like, and which afford a sealed air space enclosing resistance wires capable of heating the air space between the glass panes, thereby to remove or prevent the accumulation of ice, frost, snow, or condensed moisture thereon.

Such defrosters are commonly used during cold weather on the windshields of automobiles in which the electric current for heating the resistors is normally supplied by the usual storage battery. In order to regulate the degree of heat at the defroster, rheostats or other electrical controls have been employed in the circuit from the battery to the defroster; for less defrosting heat is required to maintain clear vision after the windshield has once been cleared of accumulated ice or snow, and excessive heating of the windshield is wasteful of current and otherwise undesirable. The use of rheostats or other resistance elements in the battery-defroster line does not, however, avoid excessive drain on the battery, for unused current is dissipated at such resistances.

It is accordingly the principal purpose of the present invention to provide a windshield defroster with an electric heating unit so constructed and arranged that either a high or low degree of heat may be selectively made available for defrosting purposes, without wasteful drain of battery current under either operating condition.

A more specific object of the invention is to provide a defroster device equipped with a plurality of effective resistance elements located in independent circuits, and a manual switch adapted to pass current through all of the resistors to supply maximum heat, or through a lesser number of resistors to supply lower heat, or to cut off the current when the defroster is not needed. With this arrangement, the defroster draws only sufficient current to heat the resistors needed to maintain a clear windshield, and all of the current consumed is usefully employed for that purpose.

A further object is to provide a convenient and efficient switch located in the ground circuit of the heating unit, to avoid complicated wiring at the switch mechanism and prevent accidental short-circuiting of the system.

A recommended embodiment of the invention is illustrated in the accompanying drawing, but it will be understood that the structure of the framed-glass panel or casing and its mounting devices form no part of this invention, and that other details of the apparatus may be varied to suit particular purposes and conditions without departing from the essence of this invention as defined in the appended claim. In the drawing, Fig. 1 is a plan view of a windshield defroster equipped with the improved heating unit;

Fig. 2 is a side view thereof;

Fig. 3 is a fragmentary end view looking to the right of Fig. 1 and showing the manual switch;

Fig. 4 is an enlarged fragmentary section taken on line 4—4 of Fig. 3;

Fig. 5 is a section taken on line 5—5 of Fig 4, showing the switch mechanism of Fig. 3 with its operating lever removed;

Fig. 6 is a fragmentary, broken section through the defroster frame, taken on line 6—6 of Fig. 5 and showing the resistors, conductors and terminals of the heating unit; and Fig. 7 is a diagrammatic view of a storage battery circuit in which the heating unit is usually located.

The defroster panel or casing comprises a substantially rectangular metal frame 11 formed with an inturned flange 12, a molded rubber sealing strip 13 fitting under the flange of the frame and depending therefrom, and a pane 14 of glass or other transparent sheet material having its margin fitting in a channel 15 of the sealing strip and wedged thereby within the metal frame. The framed-glass casing is intended to be mounted tightly on the inside of the windshield with the projecting margin of the sealing strip pressed against the surface to provide a dead air space within the applied casing; and rubber suction cups 16, connected to brackets 17 of the frame, may be suitably employed for that purpose. The cups 16 may have threaded stems 18 provided with adjusting nuts 19 for pressing the casing and its sealing strip against the glass after the suction cups have been affixed thereto.

As previously indicated, however, the general construction and design of the casing and its mounting elements are subject to wide variation, as they are not essential to this invention. Indeed, the improved heating unit may be employed in defrosters of the well-known bar type, which are not equipped with transparent panes.

In accordance with the present invention, the heating unit of the defroster herein illustrated comprises two independent pairs of parallel resistance wires: an outer pair 21 which, in the arrangement shown, are heated when the switch is moved to either of two "on" positions; and an inner pair 22 which are heated only when the switch is in the "high" position. The respective ends of the resistors 21 are attached to the ends of metal spreader bars 23 and 23', fastened to the opposite ends of the frame 11 and insulated therefrom by the intervening rubber sealing strip 13; and the respective ends of resistors 22 are attached to the arms of spreader bars 24 and 24', secured on or adjacent the bars 23 and 23' respectively.

The spreader bars constitute conductors in the circuit hereinafter explained, and one set of complemental bars are preferably in contact with each other, while the other set are insulated from each other. As here shown, bars 23 and 24 are separated by an insulating washer 25; whereas, bars 23' and 24' are connected together in juxtaposed relation by a rivet 26 or other fastening. The spreader bars are preferably made of resilient metal so that their arms tend to tighten the wire resistors and thus hold them taut when they are expanded by heat.

Bar 23' is secured to the frame by rivets 27 the heads of which are spaced from the frame by insulating washers 28, and one of said rivets serves as a terminal for the live battery wire 29. The other battery lead 30 is grounded to the frame at 31. Thus, both of the spreader-conductors 23' and 24' are in circuit with the live wire from the battery, but are insulated from the grounded frame 11.

At the opposite end of the frame, the bar 24 (insulated from bar 23 by the washer 25 as aforesaid) is secured to the frame by a rivet 32 (Fig. 6) having a head 33 constituting a switch contact; and bar 23 is secured by rivets 34 and 35. A switch plate 36 and a superposed fibre strip 37 are fastened to the outside of the frame by said rivets 32, 34 and 35, with the heads of the rivets engaging the insulating strip 37. A metal jumper strip 38 extends from rivet 34 to a contact 39 located near the contact 33 (Figs. 3 and 5); and it will be noted that said contacts 33 and 39 are in separate and independent circuits with the live lead 29 through the respective resistors 22 and 23 and their spreader bars.

One or both of these circuits may be selectively closed by operating a convenient rotary switch lever 40 comprising the bifurcated contact arm 41, and the operating handle or finger piece 42. This lever is pivotally mounted on a rivet 43 affixed to the frame 11 and thus grounded (Fig. 4), and an auxiliary ground is preferably afforded by an underlying plate 44 having an arm secured by a grounding rivet 45 preferably disposed near contact 39 (Fig. 5) and engaging the grounded switch plate 36.

The switch plate 36 has a projecting flange 46 provided with three spaced notches or recesses 47 (Fig. 5) and having an inwardly bent tongue 48 displaying the words "Off," "Low" and "High" (Fig. 1); and the opposite margin of said plate has an outwardly bent tab 49 constituting a stop finger. The handle of the switch lever 40 has a detent 50 receivable in the respective recesses 47 to hold the lever in the adjustable positions indicated by the displayed indicia; and the lever has a pair of projections 51 which are engageable with stop finger 49 to limit rotation of the lever in both directions.

When the hand piece of the lever 40 is in "off" position (Figs. 1 and 3), the contact arm 41 is inoperative; when the lever is in "low" position, one part of the bifurcated contact arm engages the contact 39 and the other part rests upon the auxiliary ground button 45, thereby closing the circuit of the resistor wires 21 only; and when the lever is in "high" position, the respective portions of the arm 40 simultaneously engage contacts 39 and 33, thereby closing the circuits of both resistors 21 and 22. It will be appreciated, as aforesaid, that the ground plate 44 is an auxiliary conductor and that the rivet or button 45 need not be so located that it is engaged by the movable switch arm 41; indeed, plate 44 may be eliminated in some installations, for the switch lever 40 is at all times grounded to the frame 11 through the rivet 43.

The circuits of the improved heating unit are diagrammatically indicated in Fig. 7 which shows the live wire 29 from the usual storage battery 52, leading directly to the conductors 23' and 24', thence to the parallel pairs of resistors 21 and 22, and finally to the respective contacts 39 and 33 through the spreaders 23 and 24 respectively. The battery is grounded, as indicated, preferably to the frame of the defroster casing as shown in Fig. 1; and the grounded switch lever 40 is arranged to close the circuit through the resistors 21 and contact 39 for low heat, or alternatively, through both pairs of resistors and both contacts 39 and 33 for high heat. Provision could obviously be made for closing the circuit through the contact 33 and resistors 22, independently of the other resistor circuit, if desired; and it is apparent that alternative selection of either of the independent resistor circuits for low heat is a matter of choice.

It will also be understood that the guage of the respective pairs of resistors may be varied so that one set consumes more current than the other. For example, the resistors 21 which supply low heat in the arrangement herein illustrated, may be guaged to consume sixty percent of the total current utilized when both circuits are closed to provide high heat, thereby effecting a saving of forty percent of the current while the resistors 22 are inactive. Thus, a windshield defroster equipped with the improved heating unit will operate efficiently at all times, without excessive and wasteful drain on the battery; and the unit may be quickly adjusted to supply high or low heat, by moving the convenient manual switch which is readily accessible to the operator of the vehicle.

The switch itself is simple and inexpensive to manufacture and assemble, and its location in the ground circuit eliminates complicated wiring and ensures that the battery leads may be easily and securely attached to the defroster casing without special fittings which would be required if they were connected to the switch. Furthermore, all exposed metal parts of the defroster casing are grounded to the frame at all times, so that the battery circuit cannot be accidentally short-circuited if the switch or frame should be struck by metal tools or instruments carried by an occupant of the vehicle.

I claim:

A windshield defroster comprising a framed glass panel adapted to be mounted on the windshield of a vehicle having a storage battery, two pairs of wire resistors extending across the frame of the panel and mechanically connected to the ends thereof but electrically insulated therefrom, spreaders attached to the respective ends of each pair of resistors and to the frame, said spreaders constituting conductor and the spreaders at one end of the frame being in contact and the spreaders at the opposite end being electrically insulated from each other, the live lead of the battery being connected to the mutually contacting spreaders and the respective mutually insulated spreaders being connected to spaced terminals, whereby the respective pairs of resistors are disposed in mutually independent circuits of the battery, the ground lead of the battery being connected to the frame, and a manual switch mounted on one end of the frame having a lever disposed adjacent said terminals and grounded to the frame, said lever being selectively operable to engage the respective terminals thereby to close one or both of said resistor circuits, whereby one pair of resistor wires may be activated to supply low defrosting heat or both pairs may be activated to suply high defrosting heat.

MAX ZAIGER.